(12) United States Patent
Osada

(10) Patent No.: US 11,611,079 B2
(45) Date of Patent: Mar. 21, 2023

(54) METHOD OF PRODUCING ELECTRODE, ELECTRODE, AND ALL-SOLID-STATE BATTERY

(71) Applicant: Toyota Jidosha Kabushiki Kaisha, Toyota (JP)

(72) Inventor: Naoki Osada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 17/095,326

(22) Filed: Nov. 11, 2020

(65) Prior Publication Data

US 2021/0151762 A1   May 20, 2021

(30) Foreign Application Priority Data

Nov. 14, 2019   (JP) .............................. JP2019-206458

(51) Int. Cl.
| | |
|---|---|
| *H01M 4/62* | (2006.01) |
| *H01M 4/139* | (2010.01) |
| *H01M 10/0562* | (2010.01) |
| *H01M 4/04* | (2006.01) |
| *H01M 4/13* | (2010.01) |

(52) U.S. Cl.
CPC .......... *H01M 4/62* (2013.01); *H01M 4/0404* (2013.01); *H01M 4/13* (2013.01); *H01M 4/139* (2013.01); *H01M 10/0562* (2013.01); *H01M 2300/0068* (2013.01)

(58) Field of Classification Search
CPC ...... H01M 4/0404; H01M 4/13; H01M 4/139; H01M 4/62; H01M 4/0409; H01M 10/0562; H01M 2300/0068; H01M 2300/008
See application file for complete search history.

(56) References Cited

U.S. PATENT DOCUMENTS

| | | | | |
|---|---|---|---|---|
| 2011/0165462 A1* | 7/2011 | Zhamu | ................... | H01M 4/663 429/231.95 |
| 2015/0162614 A1* | 6/2015 | Koshika | ................... | H01M 4/13 429/189 |
| 2015/0311490 A1* | 10/2015 | Murase | ................... | H01M 4/139 524/521 |
| 2020/0119395 A1* | 4/2020 | Chang | ................. | H01M 10/056 |

FOREIGN PATENT DOCUMENTS

| | | |
|---|---|---|
| JP | 2012-151096 A | 8/2012 |
| JP | 2013-254620 A | 12/2013 |
| JP | 2019-102412 A | 6/2019 |

\* cited by examiner

Primary Examiner — Eugenia Wang
(74) Attorney, Agent, or Firm — Dinsmore & Shohl LLP

(57) ABSTRACT

A slurry is prepared by mixing a solid electrolyte material, an electrode active material, and a dispersion medium. The eluted amount of a halogen element in the dispersion medium in the slurry is measured. When the eluted amount is within a reference range, the slurry is rated as a good slurry. An electrode is produced by applying the good slurry to a surface of a base material and drying.

4 Claims, 4 Drawing Sheets

METHOD OF PRODUCING ELECTRODE, ELECTRODE, AND ALL-SOLID-STATE BATTERY

CROSS REFERENCE TO RELATED APPLICATIONS

This nonprovisional application claims priority to Japanese Patent Application No. 2019-206458 filed on Nov. 14, 2019, with the Japan Patent Office, the entire contents of which are hereby incorporated by reference.

BACKGROUND

Field

The present disclosure relates to a method of producing an electrode, an electrode, and an all-solid-state battery.

Description of the Background Art

Japanese Patent Laying-Open No. 2019-102412 discloses adding lithium halide to sulfide solid electrolyte.

SUMMARY

An electrode of an all-solid-state battery is produced by slurry application. More specifically, a solid electrolyte material, an electrode active material, and a dispersion medium are mixed to prepare a slurry, and the resulting slurry is applied to a surface of a base material and dried to produce an electrode.

Research has been underway for sulfide solid electrolyte (for example, $Li_2S$—$P_2S_5$-type solid electrolyte). When lithium halide (LiX) is added to sulfide solid electrolyte, ionic conductivity tends to be enhanced. It may be because addition of lithium halide increases the concentration of the carrier (Li ions). However, during electrode production, ionic conductivity may decrease.

An object of the present disclosure is to produce an electrode having a high ionic conductivity, with a good reproducibility.

In the following, the technical structure and the effects according to the present disclosure are described. It should be noted that the action mechanism according to the present disclosure includes presumption. The action mechanism according to the present disclosure does not limit the scope of claims.

(1) A method of producing an electrode according to the present disclosure includes (a), (b), (c), and (d) below:

(a) preparing a slurry by mixing a solid electrolyte material, an electrode active material, and a dispersion medium;

(b) measuring an eluted amount of a halogen element in the dispersion medium in the slurry;

(c) rating the slurry as a good slurry when the eluted amount is within a reference range; and (d) producing an electrode by applying the good slurry to a surface of a base material and drying.

The solid electrolyte material includes a halogen element, Li (lithium), P (phosphorus), and S (sulfur). The halogen element includes at least one selected from the group consisting of Br (bromine) and I (iodine).

In the slurry, the solid electrolyte material and the dispersion medium are in contact with each other. The solid electrolyte material may react with the dispersion medium. As a result of the reaction between the solid electrolyte material and the dispersion medium, constituent elements of the solid electrolyte material may be partially eluted into the dispersion medium.

The present disclosure has newly found that, in a configuration in which a certain amount of halogen element is eluted in the dispersion medium, the electrode tends to have an enhanced ionic conductivity. The detailed mechanism of this phenomenon is unclear at this point. The most probable mechanism at this point is the below mechanism.

In a configuration in which a certain amount or more of halogen element is eluted in the dispersion medium in the slurry, the electrode may have segregation of halogen element. The segregated halogen element may form a halide (for example, lithium halide). The halide may have a low ionic conductivity. In the electrode, the solid electrolyte material forms ionic conduction paths. The halide may serve as an obstacle in the ionic conduction paths. Segregation of halide may decrease the ionic conductivity of the electrode.

On the other hand, when the solid electrolyte material moderately reacts with the dispersion medium in the slurry, the affinity between the solid electrolyte material and the dispersion medium may be enhanced. The enhanced affinity may lead to an enhanced dispersibility of the solid electrolyte material (particles) in the slurry. This may further lead to an enhanced dispersibility of the solid electrolyte material in the electrode. In such an electrode where the solid electrolyte material is well dispersed, ionic conduction may be facilitated; in other words, ionic conductivity is expected to be enhanced.

In this way, when the eluted amount of halogen element in the slurry is controlled to fall within a reference range, an electrode having a high ionic conductivity is expected to be produced with a good reproducibility.

Hereinafter, the "eluted amount of halogen element" is also called "halogen eluted amount".

(2) In the method of producing an electrode according to (1) above, the reference range may be, for example, from 155 mass ppm to 470 mass ppm relative to a mass of the solid electrolyte material.

For example, when the halogen eluted amount is 155 mass ppm or more, the affinity between the solid electrolyte material and the dispersion medium is expected to be enhanced. For example, when the halogen eluted amount is 470 mass ppm or less, halide segregation is expected to be reduced.

(3) In the method of producing an electrode according to (1) or (2) above, the dispersion medium may include a carboxylate ester, for example.

The carboxylate ester may moderately react with the solid electrolyte material.

(4) An electrode according to the present disclosure includes a first phase and a second phase.

The first phase includes a solid electrolyte material. The second phase includes an electrode active material.

The solid electrolyte material includes a halogen element, Li, P, and S.

The halogen element includes at least one selected from the group consisting of Br and I.

The first phase includes a halogen segregation portion. The halogen segregation portion has segregation of halogen element. The ratio of an area of the halogen segregation portion to an area of the first phase on a surface of the electrode is from 0.01 to 0.04.

Hereinafter, the "ratio of an area of the halogen segregation portion to an area of the first phase" is also called "halogen segregation index". The halogen segregation index is calculated from results of mapping analysis conducted with an SEM-EDX (scanning electron microscope energy dispersive x-ray microanalyzer). When the halogen segregation index is within the range of 0.01 to 0.04, the electrode tends to have an enhanced ionic conductivity. It may be because the solid electrolyte material is well dispersed with a low level of halide segregation.

(5) An all-solid-state battery according to the present disclosure may include the electrode according to (4) above.

The all-solid-state battery according to the present disclosure is expected to have a high power, for example. It may be because the electrode has a high ionic conductivity.

The foregoing and other objects, features, aspects and advantages of the present disclosure will become more apparent from the following detailed description of the present disclosure when taken in conjunction with the accompanying drawings.

DETAILED DESCRIPTION

In the following, embodiments of the present disclosure (hereinafter also called "present embodiment") are described. However, the description below does not limit the scope of claims.

In the present embodiment, phrases such as "from 155 mass ppm to 470 mass ppm" mean a range that includes the boundary values, unless otherwise specified. As a specific example, the phrase "from 155 mass ppm to 470 mass ppm" means a range of "not less than 155 mass ppm and not more than 470 mass ppm".

<Method of Producing Electrode>

Figure 1:
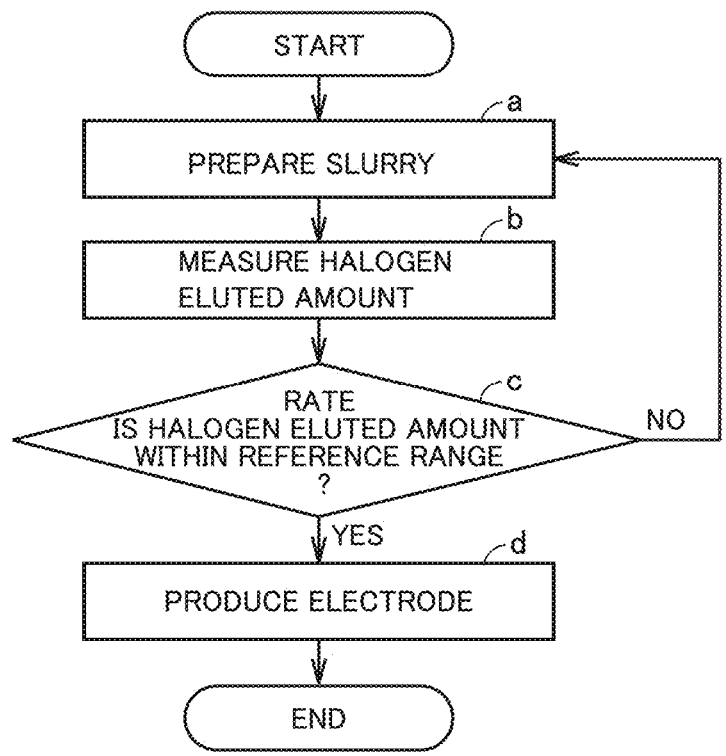
FIG. 1 is a schematic flowchart of a method of producing an electrode according to the present embodiment.

FIG. 1 is a schematic flowchart of a method of producing an electrode according to the present embodiment.

The method of producing an electrode according to the present embodiment includes "(a) preparing a slurry", "(b) measuring a halogen eluted amount", "(c) rating", and "(d) producing an electrode".

<<(a) Preparing Slurry>>

The method of producing an electrode according to the present embodiment includes preparing a slurry by mixing a solid electrolyte material, an electrode active material, and a dispersion medium.

In the present embodiment, any mixing apparatus and/or any stirring apparatus may be used. For example, materials may be mixed with an ultrasonic disperser, a shaker, and/or the like. The mixing duration may be from 10 seconds to 12 hours, for example.

The slurry may be prepared so as to further include a conductive material, a binder, and the like in addition to the solid electrolyte material and the like. The concentration of nonvolatile matter (NV) in the slurry may be adjusted to fall within the range of 40 mass % to 80 mass %, for example. The nonvolatile matter refers to a component other than the dispersion medium. The nonvolatile matter is also called "solid matter".

After the slurry is prepared, the resulting slurry may be left to stand for a predetermined period of time. For example, the duration and the like of the standing may be changed to adjust a halogen eluted amount. The standing duration may be from 10 minutes to 24 hours, for example. The standing duration may be from 20 minutes to 15 hours, for example. The standing duration may be from 20 minutes to 3 hours, for example.

(Solid Electrolyte Material)

The solid electrolyte material may be in powder (particles), for example. The solid electrolyte material may have a $D_{50}$ from 0.1 μm to 10 μm, for example. The "$D_{50}$" according to the present embodiment refers to a particle size in volume-based particle size distribution at which the cumulative particle volume (accumulated from the side of small sizes) reaches 50% of the total particle volume. The $D_{50}$ may be measured with a laser-diffraction particle size distribution analyzer.

The amount of the solid electrolyte material in the slurry may be, for example, from 1 part by mass to 30 parts by mass relative to 100 parts by mass of the electrode active material.

The solid electrolyte material is a Li-ion conductor. The solid electrolyte material is substantially a non-conductor. In other words, the solid electrolyte material does not substantially conduct electrons.

The solid electrolyte material may be glass. The solid electrolyte material may be glass ceramics (also called "crystallized glass"). For example, the glass ceramics may be formed by heat treatment of glass. For example, the heat treatment temperature may be from 100° C. to 300° C. For example, the heat treatment temperature may be from 200° C. to 250° C. For example, the heat treatment temperature may be from 200° C. to 220° C. For example, the heat treatment duration may be from 1 hour to 72 hours. For example, the heat treatment duration may be from 24 hours to 72 hours.

The solid electrolyte material includes a halogen element (X), Li, P, and S. The solid electrolyte material may consist essentially of X, Li, P, and S. For example, X, Li, P, and S may form an amorphous phase. For example, Li, P, and S may form a crystalline phase (for example, $Li_7P_3S_{11}$). The solid electrolyte material may further include at least one selected from the group consisting of O (oxygen), Si (silicon), Ge (germanium), and Sn (tin), for example.

The halogen element includes at least one selected from the group consisting of Br and I. The halogen element may consist essentially of Br and I. The halogen element may further include at least one selected from the group consisting of F (fluorine) and Cl (chlorine), for example.

The composition of the glass or the glass ceramics may be expressed by the blending ratio of the raw materials, for example. The solid electrolyte material according to the present embodiment may be expressed by, for example, a formula (1):

$$xLiI\text{-}yLiBr\text{-}(100\text{-}x\text{-}y)[(1\text{-}z)Li_2S\text{-}zP_2S_5] \tag{1}$$

where "x, y, z" may satisfy the following relations, for example: $0 \leq x$, $0 \leq y$, $0 < (x+y) < 100$, $0 < z < 1$.

For example, a mixture of at least one selected from the group consisting of LiI and LiBr with $[(1-z)Li_2S\text{-}zP_2S_5]$ is subjected to mechanical milling treatment. The mixing ratio (molar ratio) is "$LiI:LiBr:[(1-z)Li_2S\text{-}zP_2S_5]=x:y:(100\text{-}x\text{-}y)$".

By the mechanical milling treatment, glass may be formed. The glass may have a composition expressed by the formula (1). The glass may further be subjected to heat treatment to form glass ceramics. The glass ceramics may have the composition expressed by the formula (1).

The "mechanical milling treatment" applies mechanical energy to a mixed powder including two or more materials to synthesize a compound. For example, the mechanical milling treatment may be performed with a ball mill and/or the like. For example, the duration of the mechanical milling treatment may be changed so as to adjust the halogen eluted amount. For example, the treatment duration may be from 24 hours to 120 hours. For example, the treatment duration may be from 24 hours to 72 hours. For example, the treatment duration may be from 48 hours to 72 hours. For example, the treatment duration may be from 24 hours to 48 hours.

For example, a mixture of $Li_2S$ and $P_2S_5$ is subjected to the mechanical milling treatment. The mixing ratio (molar ratio) is "$Li_2S:P_2S_5=(1-z):z$". By the mechanical milling treatment, glass may be formed. The glass may have a composition expressed by $[(1-z)Li_2S-zP_2S_5]$. The glass may further be subjected to heat treatment to form glass ceramics. The glass ceramics may have a composition expressed by $[(1-z)Li_2S-zP_2S_5]$. A solid electrolyte material represented by $[(1-z)Li_2S-zP_2S_5]$ is also called "$Li_2S$—$P_2S_5$-type solid electrolyte".

For example, in the formula (1), a relation of "$10<(x+y)<35$" may be satisfied. For example, a relation of "$15<(x+y)<30$" may be satisfied. For example, a relation of "$20\leq(x+y)\leq25$" may be satisfied.

For example, in the formula (1), a relation of "$10\leq x\leq15$" may be satisfied. For example, a relation of "$10\leq y\leq15$" may be satisfied.

For example, in the formula (1), a relation of "$0.1<z<0.5$" may be satisfied. For example, a relation of "$0.2<z<0.4$" may be satisfied. For example, a relation of "$0.2<z<0.3$" may be satisfied.

For example, the solid electrolyte material may include at least one selected from the group consisting of:

$10LiI-10LiBr-80[0.75Li_2S-0.25P_2S_5]$, $10LiI-15LiBr-75[0.75Li_2S-0.25P_2S_5]$, and $15LiI-10LiBr-75[0.75Li_2S-0.25P_2S_5]$.

For example, "$10LiI-10LiBr-80[0.75Li_2S-0.25P_2S_5]$" expresses that it consists of a component derived from LiI by 10 mol %, a component derived from LiBr by 10 mol %, and a component derived from $[0.75Li_2S-0.25P_2S_5]$ by 80 mol %. $[0.75Li_2S-0.25P_2S_5]$ expresses that $[0.75Li_2S-0.25P_2S_5]$ consists of a component derived from $Li_2S$ by 75 mol % and a component derived from $P_2S_5$ by 25 mol %.

The ionic conductivity of the solid electrolyte material may be measured by an AC impedance method, for example. The ionic conductivity of the solid electrolyte material according to the present embodiment may be from 3.6 mS/cm to 4.0 mS/cm, for example.

(Electrode Active Material)

The electrode active material may be in powder (particles), for example. The electrode active material may have a $D_{50}$ from 1 μm to 30 μm, for example.

The electrode active material is a material capable of occluding and releasing Li ions. The electrode active material is also capable of occluding and releasing electrons.

The electrode active material may be a positive electrode active material, for example. In other words, a positive electrode may be produced. The positive electrode active material may include any component. The positive electrode active material may include at least one selected from the group consisting of lithium cobalt oxide, lithium nickel oxide, lithium manganese oxide, lithium nickel cobalt aluminate, lithium nickel cobalt manganese oxide, and lithium iron phosphate, for example.

The electrode active material may be a negative electrode active material, for example. In other words, a negative electrode may be produced. The negative electrode active material may include any component. The negative electrode active material may include at least one selected from the group consisting of graphite, hard carbon, soft carbon, Si, silicon oxide, silicon-based alloy, Sn, tin oxide, tin-based alloy, and lithium titanium oxide, for example.

(Dispersion Medium)

The dispersion medium according to the present embodiment is liquid. For example, the dispersion medium may be nonpolar. For example, the dispersion medium may be polar. The dispersion medium may include any component. The dispersion medium may include at least one selected from the group consisting of benzene, hexane, heptane, toluene, mesitylene, water, ethanol, dibutyl ether, acetone, tetrahydrofuran (THF), N-methyl-2-pyrrolidone (NMP), and formic acid, for example.

The dispersion medium may include a carboxylate ester, for example. The dispersion medium may consist essentially of a carboxylate ester. The carboxylate ester may be moderately polar. The carboxylate ester may moderately react with the solid electrolyte material. When the dispersion medium includes a carboxylate ester, a proper amount of halogen element may be eluted. The dispersion medium may include at least one selected from the group consisting of ethyl acetate, butyl acetate, butyl butyrate, pentyl butyrate, hexyl butyrate, butyl pentanoate, pentyl pentanoate, hexyl pentanoate, butyl hexanoate, pentyl hexanoate, and hexyl hexanoate, for example.

(Conductive Material)

The slurry may include a conductive material, for example. The conductive material is a conductor. The conductive material conducts electrons. The amount of the conductive material in the slurry may be, for example, from 0.1 parts by mass to 10 parts by mass relative to 100 parts by mass of the electrode active material. The conductive material may include any component. The conductive material may include at least one selected from the group consisting of vapor grown carbon fiber (VGCF), carbon nanotube (CNT), carbon black, and graphene flake, for example.

(Binder)

The slurry may include a binder. The binder combines nonvolatile matter to each other. The binder may be dispersed in the dispersion medium. The binder may be dissolved in the dispersion medium. The amount of the binder in the slurry may be, for example, from 0.1 parts by mass to 10 parts by mass relative to 100 parts by mass of the electrode active material. The binder may include any component. The binder may include at least one selected from the group consisting of polyvinylidene difluoride (PVDF), vinylidene difluoride-hexafluoropropylene copolymer (PVDF-HFP), polytetrafluoroethylene (PTFE), styrene-butadiene rubber (SBR), polyacrylic acid (PAA), and carboxymethylcellulose (CMC), for example.

(Other Components)

The slurry may further include any component in addition to the above-described components. For example, the slurry may further include a surfactant, a pH regulator, an oxide solid electrolyte, and/or the like. For example, a film of an oxide solid electrolyte may be formed on a surface of the positive electrode active material. The oxide solid electrolyte may include $LiNbO_3$, for example.

<<(b) Measuring Halogen Eluted Amount>>

The method of producing an electrode according to the present embodiment includes measuring the halogen eluted amount in the dispersion medium in the slurry.

The halogen eluted amount is measured by ICP-AES (inductively coupled plasma atomic emission spectrometry). The sample to be measured is the supernatant of the slurry. It is considered that the supernatant obtained after the slurry is sufficiently left to stand consists essentially of the dispersion medium. When the supernatant includes nonvolatile matter, the supernatant may be filtered. The supernatant may be diluted as appropriate. An ICP-AES apparatus is used to measure the mass concentration of halogen element in the supernatant. The mass concentration of halogen element in the supernatant is converted to the mass concentration of halogen element in the slurry. Further, the mass concentration of halogen element in the slurry is divided by the mass concentration of the solid electrolyte material in the slurry to obtain the halogen eluted amount (a value relative to the mass of the solid electrolyte material). When the halogen element includes a plurality of elements, the halogen eluted amount corresponds to the sum of the eluted amounts of all the elements.

<<(c) Rating>>

The method of producing an electrode according to the present embodiment includes rating the slurry as a good slurry when the halogen eluted amount is within a reference range.

The reference range may be determined by, for example, a preparatory experiment and/or the like. For example, a scatter diagram for the relation between the halogen eluted amount and the ionic conductivity of the electrode may be generated. Based on the tendency shown in the scatter diagram, the reference range may be determined.

The reference range may be, for example, from 155 mass ppm to 470 mass ppm relative to the mass of the solid electrolyte material. For example, when the halogen eluted amount is 155 mass ppm or more, the affinity between the solid electrolyte material and the dispersion medium is expected to be enhanced. For example, when the halogen eluted amount is 470 mass ppm or less, halide segregation is expected to be reduced.

For example, the lower limit to the reference range may be 170 mass ppm. For example, the lower limit to the reference range may be 216 mass ppm. For example, the upper limit to the reference range may be 220 mass ppm.

For example, the eluted amount of I may also have a reference range. For example, the reference range for the eluted amount of I may be from 55 mass ppm to 190 mass ppm. For example, the lower limit to the reference range may be 60 mass ppm. For example, the lower limit to the reference range may be 70 mass ppm. For example, the upper limit to the reference range may be 86 mass ppm.

For example, the eluted amount of Br may also have a reference range. For example, the reference range for the eluted amount of Br may be from 100 mass ppm to 280 mass ppm. For example, the lower limit to the reference range may be 110 mass ppm. For example, the lower limit to the reference range may be 130 mass ppm. For example, the upper limit to the reference range may be 150 mass ppm.

When the halogen eluted amount is lower than the lower limit to the reference range, such an operation as facilitating halogen element elution may be carried out. For example, another round of stirring and leaving the slurry may be carried out.

When the halogen eluted amount exceeds the upper limit to the reference range, such an operation as reducing the halogen eluted amount may be carried out. For example, the slurry may be brought into contact with an adsorbent that is capable of adsorbing the halogen element. When the halogen eluted amount is difficult to reduce, a new slurry may be prepared. When the halogen eluted amount exceeds the upper limit to the reference range, the slurry may be discarded, for example. From the discarded slurry, reusable material may be collected.

<<(d) Producing Electrode>>

The method of producing an electrode according to the present embodiment includes producing an electrode by applying the good slurry to a surface of a base material and drying.

In the present embodiment, any application technique may be used. For example, a doctor blade, a die coater, a gravure coater, and/or the like may be used. In the present embodiment, any drying technique may be used. For example, a hot-air dryer, an infrared dryer, a hot plate, and/or the like may be used.

In the present embodiment, any base material may be used. The base material may be a conductor, for example. In other words, the base material may be an electrode current collector. The base material may be an aluminum (Al) foil, a nickel (Ni) foil, a titanium (Ti) foil, and/or a copper (Cu) foil, for example.

After the slurry is dried on the surface of the base material, an electrode active material layer may be formed. In this way, an electrode may be produced. The electrode may be machined into any size. For example, the electrode may be rolled. For example, the electrode may be cut.

<Electrode>

Figure 2:
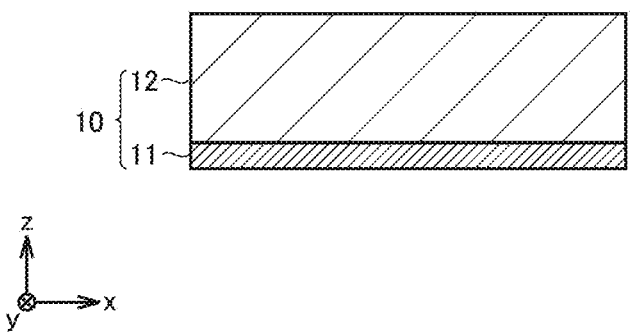
FIG. 2 is a conceptual cross-sectional view illustrating the configuration of an electrode according to the present embodiment.

FIG. 2 is a conceptual cross-sectional view illustrating the configuration of an electrode according to the present embodiment.

An electrode 10 may be a positive electrode, for example. Electrode 10 may be a negative electrode, for example. Electrode 10 includes a base material 11 and an electrode active material layer 12. Base material 11 may have a thickness from 5 μm to 30 μm, for example. Electrode active material layer 12 is formed on a surface of base material 11. Electrode active material layer 12 may have a thickness from 10 μm to 100 μm, for example.

Electrode 10 may have a high ionic conductivity. For example, electrode 10 may have an ionic conductivity of 0.038 mS/cm or more. For example, electrode 10 may have an ionic conductivity of 0.040 mS/cm or more. For example, electrode 10 may have an ionic conductivity of 0.042 mS/cm or more. For example, electrode 10 may have an ionic conductivity of 0.043 mS/cm or less.

Figure 6:
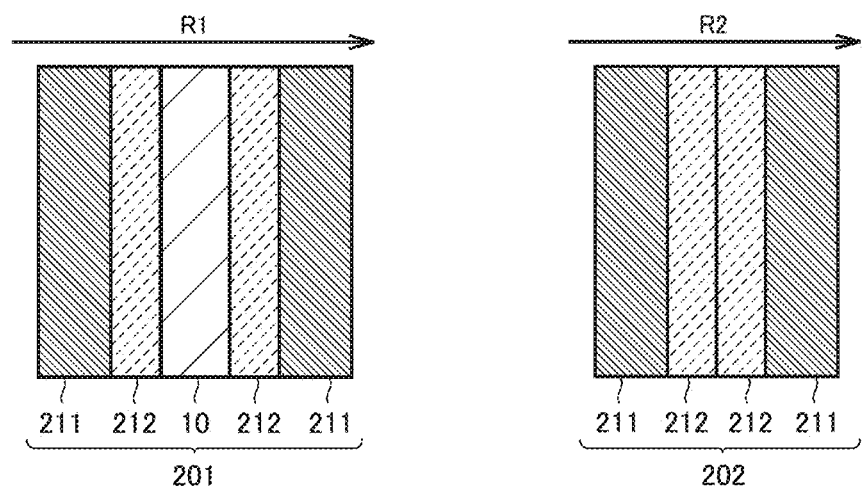
FIG. 6 is a descriptive view for describing a method of measuring the ionic conductivity of an electrode.

FIG. 6 is a descriptive view for describing a method of measuring the ionic conductivity of an electrode.

A Li foil 211, a solid electrolyte layer 212, electrode 10, solid electrolyte layer 212, and Li foil 211 may be stacked to form a first cell 201. Solid electrolyte layer 212 may have the same configuration as that of a separator described below. In first cell 201, a direct current is applied between Li foils 211. Voltage change upon the application of current is measured. From the voltage change, resistivity of first cell 201 (R1) is calculated.

Li foil 211, solid electrolyte layer 212, solid electrolyte layer 212, and Li foil 211 are stacked to form a second cell 202. In second cell 202, a direct current is applied between Li foils 211. Voltage change upon the application of current is measured. From the voltage change, resistivity of second cell 202 (R2) is calculated. The difference between "R1" and "R2" is regarded as the resistivity of electrode 10. The reciprocal of the resistivity of electrode 10 is regarded as the ionic conductivity of electrode 10.

<<Halogen Segregation Index>>

Electrode 10 according to the present embodiment has a halogen segregation index from 0.01 to 0.04. When the halogen segregation index is within the range of 0.01 to 0.04, the electrode tends to have an enhanced ionic conductivity. It may be because the solid electrolyte material is well dispersed with a low level of halide segregation. For example, the halogen segregation index may be 0.02 or more. For example, the halogen segregation index may be 0.03 or less. The halogen segregation index is calculated from results of mapping analysis conducted with an SEM-EDX.

Figure 3:
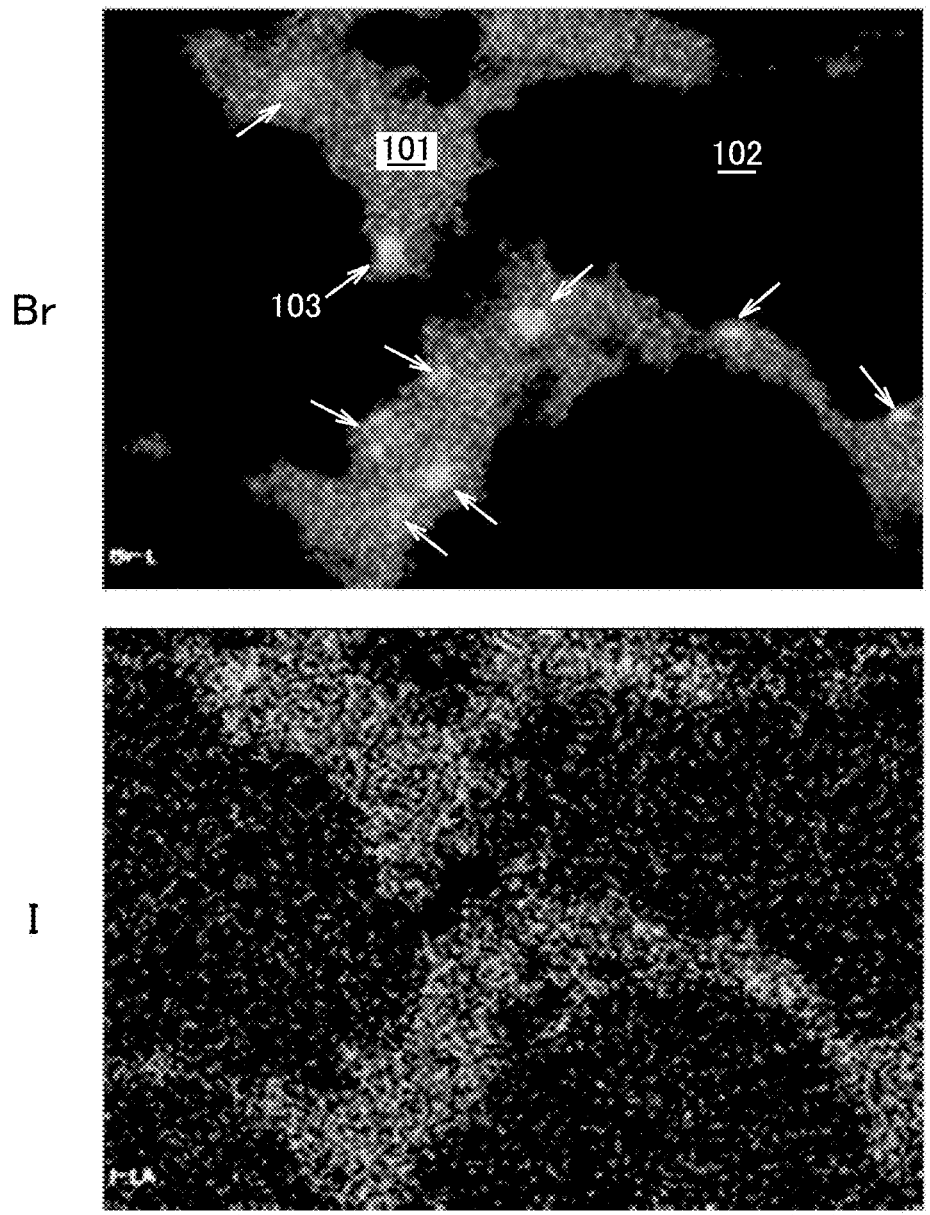
FIG. 3 is a first example of results of mapping analysis conducted with an SEM-EDX.

FIG. 3 is a first example of results of mapping analysis conducted with an SEM-EDX.

With an SEM-EDX, mapping analysis is carried out for a surface of electrode active material layer 12. In other words, mapping analysis is carried out for a surface of electrode 10. On the surface of electrode 10, five positions are randomly selected for measurement. These positions are away from each other by 10 mm or more, for example.

Each position is subjected to mapping analysis. The area of analysis is a rectangular area of "width:length=20 μm:15 μm". The mapping image includes a bright portion (gray portion) and a dark portion (black portion). The bright portion corresponds to a first phase 101. The dark portion corresponds to a second phase 102. In other words, electrode 10 includes first phase 101 and second phase 102.

First phase 101 includes a solid electrolyte material. First phase 101 may consist essentially of a solid electrolyte material. The details of the solid electrolyte material are as described above. When the solid electrolyte material includes two or more halogen elements, mapping analysis is carried out for each halogen element. FIG. 3 shows a mapping image of Br and a mapping image of I.

Second phase 102 includes an electrode active material. For example, second phase 102 may further include a conductive material, a binder, and the like. For example, second phase 102 may consist of an electrode active material, a conductive material, and a binder. The details of the electrode active material and the like are as described above.

First phase 101 includes a halogen segregation portion 103. Halogen segregation portion 103 has segregation of halogen element (Br, I). There is a big difference in contrast between halogen segregation portion 103 and the other part of first phase 101. It is considered that the higher the luminance of the pixel of interest is, the higher the halogen element concentration is in that pixel.

According to the present embodiment, a pixel with 10 atom % halogen element or more detected by EDX semi-quantitative analysis is regarded as belonging to halogen segregation portion 103.

Pixels belonging to halogen segregation portion 103 are counted. Pixels belonging to first phase 101 are counted. The number of pixels belonging to halogen segregation portion 103 is divided by the number of pixels belonging to first phase 101 to obtain the halogen segregation index for the area of analysis. In other words, the halogen segregation index is the ratio of the area of halogen segregation portion 103 to the area of first phase 101. The result of division is significant to two decimal place. It is rounded to two decimal place.

When the solid electrolyte material includes two or more halogen elements, the halogen segregation index for each halogen element is calculated. The sum of the halogen segregation indices for all the halogen elements is regarded as the halogen segregation index for the area of analysis.

For each of the five positions randomly selected on the surface of electrode 10, a halogen segregation index is measured. The arithmetic mean of the halogen segregation indices for these five positions is regarded as the halogen segregation index for electrode 10.

In electrode 10 illustrated in FIG. 3, the halogen segregation index exceeds 0.04. Due to the high level of halogen element segregation, the ionic conductivity may be reduced.

Figure 4:
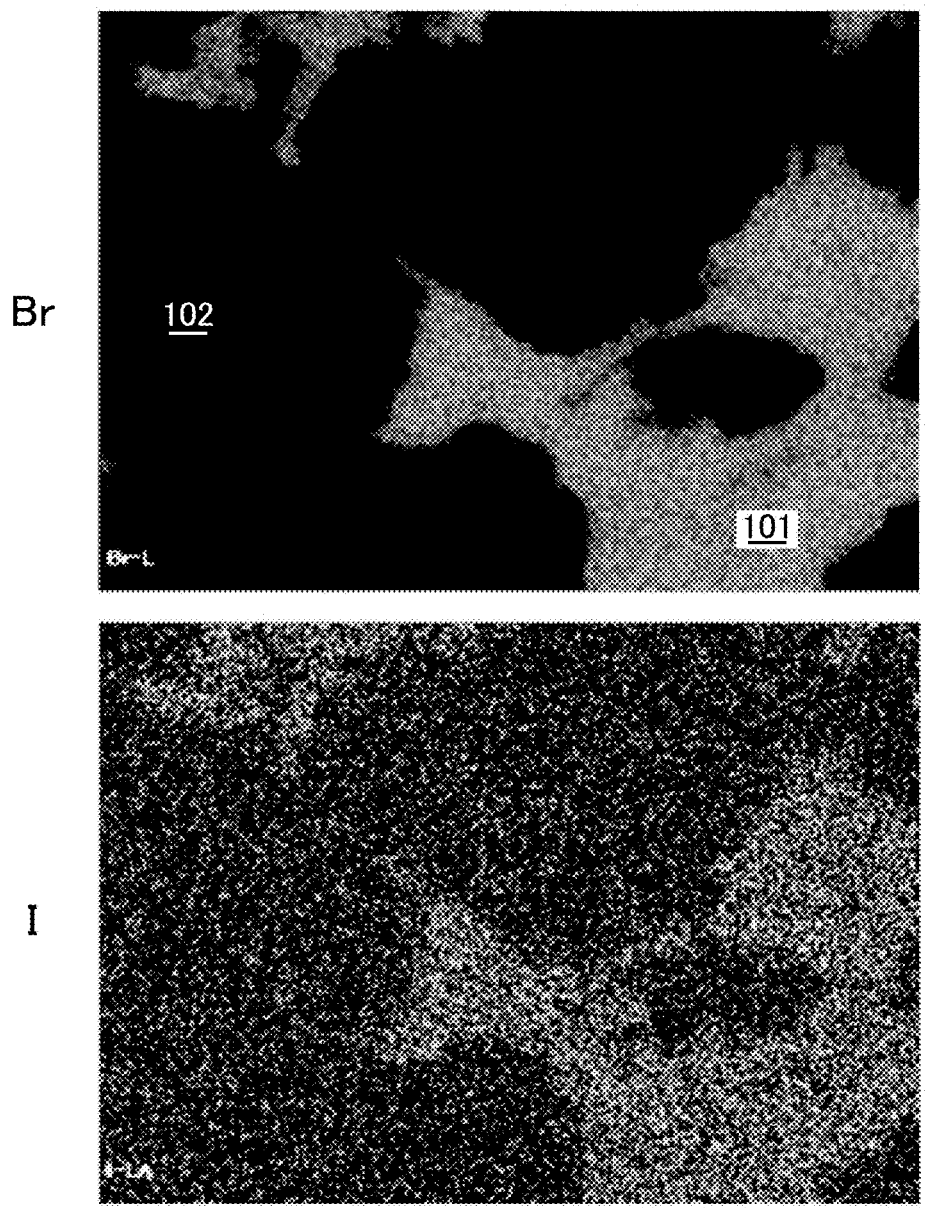
FIG. 4 is a second example of results of mapping analysis conducted with an SEM-EDX.

FIG. 4 is a second example of results of mapping analysis conducted with an SEM-EDX.

In FIG. 4, the halogen segregation index is lower than 0.01. In FIG. 4, the level of halogen element segregation is low. However, the ionic conductivity of electrode 10 may also be low. It may be due to the uneven distribution of first phase 101 (solid electrolyte material). There is a possibility that the affinity between the solid electrolyte material and the dispersion medium in the slurry is low and thereby the dispersibility of the solid electrolyte material (particles) is decreased.

<All-Solid-State Battery>

Figure 5:
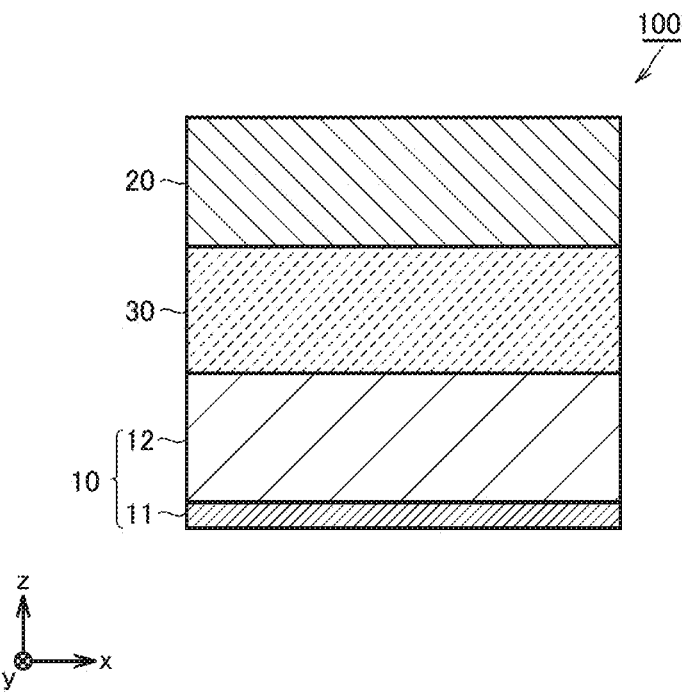
FIG. 5 is a conceptual cross-sectional view illustrating the configuration of an all-solid-state battery according to the present embodiment.

FIG. 5 is a conceptual cross-sectional view illustrating the configuration of an all-solid-state battery according to the present embodiment.

An all-solid-state battery 100 includes electrode 10, a separator 30, and a counter electrode 20. Electrode 10, separator 30, and counter electrode 20 may be enclosed within a predetermined case (not illustrated). The case may be a pouch made of an Al-laminated film, for example.

Electrode 10 has a polarity opposite to the polarity of counter electrode 20. For example, electrode 10 is a positive electrode and counter electrode 20 is a negative electrode. Electrode 10 may be a positive electrode. Electrode 10 may be a negative electrode. All-solid-state battery 100 is expected to have a high power. It may be because the ionic conductivity of electrode 10 is high.

Counter electrode 20 may also have the electrode configuration according to the present embodiment. More specifically, counter electrode 20 may also have a halogen segregation index from 0.01 to 0.04. When each of electrode 10 and counter electrode 20 has a halogen segregation index from 0.01 to 0.04, enhanced power is expected to be obtained.

Separator 30 is interposed between electrode 10 and counter electrode 20. Separator 30 may have a thickness from 10 μm to 50 μm, for example. Separator 30 includes a solid electrolyte material. Separator 30 may consist essentially of a solid electrolyte material. Separator 30 may further include a binder and/or the like, for example. Separator 30 may include any solid electrolyte material. For example, separator 30 may include $Li_2S$—$P_2S_5$-type solid electrolyte and/or the like.

EXAMPLES

Next, examples according to the present disclosure (herein also called "the present example") are described. However, the description below does not limit the scope of claims.

<Sample 1>
<<(a) Preparing Slurry>>
The materials described below were prepared.
Lithium halide: LiI, LiBr
Sulfide solid electrolyte: $0.75Li_2S$-$0.25P_2S_5$ A zirconia pot was prepared. The size of the pot was 500 ml. In a glove box with an argon atmosphere, the pot was fed with materials (total 100 g) in a predetermined mixing ratio. The mixing ratio (molar ratio) of the materials was "LiI: LiBr:[0.75Li$_2$S-0.25P$_2$S$_5$]=10:15:75". To the pot, 400 g of balls and 200 g of heptane were added. The balls were made of zirconia. The size of each ball was φ10 mm. The pot was secured by a stainless steel holder and closed air-tight.

The pot was installed on a planetary ball mill (manufactured by Fritsch Co., Ltd.). The ball mill was operated at a rotational speed of 300 rpm (5 s$^{-1}$) for 24 hours to perform mechanical milling treatment. Thus, a precursor (glass) was prepared.

The precursor was pulverized so as to adjust the size of the precursor particles. After the particle size was adjusted, the precursor was subjected to heat treatment at 220° C. to prepare a solid electrolyte material. The solid electrolyte material was glass ceramics.

The materials described below were prepared.
Electrode active material: positive electrode active material
Conductive material: VGCF
Binder: PVDF
Dispersion medium: carboxylate ester (polar)

A polypropylene (PP) vessel was prepared. Into the vessel, the electrode active material, the solid electrolyte material, the conductive material, the binder, and the dispersion medium were added in a predetermined mixing ratio. An ultrasonic disperser (model: UH-50) manufactured by SMT Co., Ltd. was used to stir the mixture in the vessel for 30 seconds. Then, a shaker (model: TTM-1) manufactured by Sibata Scientific Technology Ltd. was used to shake the mixture for a predetermined time. In this way, a slurry was prepared. The slurry was left to stand for 15 hours.

<<(b) Measuring Halogen Eluted Amount>>

After the 15 hours of standing, the supernatant of the slurry was collected. The halogen eluted amount in the dispersion medium was measured by ICP-AES. Results are shown in Table 1 below.

<<(d) Producing Electrode>>

As a base material, an Al foil was prepared. To the surface of the base material, the slurry was applied with a film applicator (doctor blade). The slurry was dried on a hot plate. Thus, an electrode active material layer was formed on the surface of the base material. In other words, an electrode was produced.

<Sample 2>

Except that a solid electrolyte material having the composition specified in Table 1 below was prepared, the same manner as for sample 1 was adopted to produce an electrode.

<Sample 3>

Except that mesitylene was used as a dispersion medium, the same manner as for sample 1 was adopted to produce an electrode. Mesitylene is nonpolar.

<Sample 4>

Except that the duration of mechanical milling treatment was changed to 48 hours and a solid electrolyte material having the composition specified in Table 1 below was prepared, the same manner as for sample 1 was adopted to produce an electrode.

<Sample 5>

Except that the duration of mechanical milling treatment was changed to 72 hours and a solid electrolyte material having the composition specified in Table 1 below was prepared, the same manner as for sample 1 was adopted to produce an electrode.

<Sample 6>

Except that the slurry standing duration was changed to 20 minutes, the same manner as for sample 1 was adopted to produce an electrode.

<Sample 7>

Except that the slurry standing duration was changed to 3 hours, the same manner as for sample 1 was adopted to produce an electrode.

<Sample 8>

Except that the size of the balls in the ball mill was changed to φ5 mm, the duration of mechanical milling treatment was changed to 72 hours, the precursor heat treatment temperature was changed to 200° C., and a solid electrolyte material having the composition specified in Table 1 below was prepared, the same manner as for sample 1 was adopted to produce an electrode.

<Evaluation>

For each electrode, a halogen segregation index was measured in the above-described manner. Results are shown in Table 1 below. In the above-described manner, the ionic conductivity of the electrode was measured. Results are shown in Table 1 below.

TABLE 1

List of experiment results

| | Slurry | | | | | | | Electrode | |
|---|---|---|---|---|---|---|---|---|---|
| | Solid electrolyte material | | Dispersion | Halogen eluted amount | | | Halogen | Ionic |
| | | Ionic conductivity | medium | (mass ppm) | | | segregation | conductivity |
| | Composition (mol %) | (mS/cm) | Type | I | Br | Sum | index (—) | (mS/cm) |
| Sample 1 | 10LiI—15LiBr—75 [0.75Li$_2$S—0.25P$_2$S$_5$] | 3.6 | Carboxylate ester | 770 | 500 | 1270 | 0.10 | 0.030 |
| Sample 2 | 10LiI—10LiBr—80 [0.75Li$_2$S—0.25P$_2$S$_5$] | 3.8 | Carboxylate ester | 360 | 500 | 860 | 0.07 | 0.030 |
| Sample 3 | 10LiI—15LiBr—75 [0.75Li$_2$S—0.25P$_2$S$_5$] | 3.6 | Mesitylene | 1 | 1 | 2 | 0 | 0.020 |
| Sample 4 | 10LiI—10LiBr—80 [0.75Li$_2$S—0.25P$_2$S$_5$] | 3.8 | Carboxylate ester | 60 | 110 | 170 | 0.02 | 0.043 |
| Sample 5 | 10LiI—10LiBr—80 [0.75Li$_2$S—0.25P$_2$S$_5$] | 3.6 | Carboxylate ester | 70 | 150 | 220 | 0.03 | 0.040 |
| Sample 6 | 10LiI—15LiBr—75 [0.75Li$_2$S—0.25P$_2$S$_5$] | 3.6 | Carboxylate ester | 55 | 100 | 155 | 0.01 | 0.042 |
| Sample 7 | 10LiI—15LiBr—75 [0.75Li$_2$S—0.25P$_2$S$_5$] | 3.6 | Carboxylate ester | 190 | 280 | 470 | 0.04 | 0.038 |

TABLE 1-continued

List of experiment results

| | Slurry | | | | | | Electrode | |
|---|---|---|---|---|---|---|---|---|
| | Solid electrolyte material | | Dispersion medium | Halogen eluted amount (mass ppm) | | | Halogen segregation | Ionic conductivity |
| | Composition (mol %) | Ionic conductivity (mS/cm) | Type | I | Br | Sum | index (—) | (mS/cm) |
| Sample 8 | 10LiI—10LiBr—80[0.75Li$_2$S—0.25P$_2$S$_5$] | 4.0 | Carboxylate ester | 86 | 130 | 216 | 0.04 | 0.040 |

<Results>

As illustrated in Table 1 above, a correlation is observed between the halogen eluted amount of the slurry and the ionic conductivity of the electrode. In other words, when the halogen eluted amount is excessively high, the ionic conductivity tends to be low (sample 1 and sample 2); and when the halogen eluted amount is excessively low, the ionic conductivity tends to be low (sample 3).

The results of the present example suggest that when a reference range is set for the halogen eluted amount, an electrode having a high ionic conductivity is produced with a good reproducibility. More specifically, it is considered that when the method of producing an electrode includes "(c) rating the slurry as a good slurry when the halogen eluted amount is within a reference range", an electrode having a high ionic conductivity is produced with a good reproducibility. As for the results of the present example, a range of the halogen eluted amount from 155 mass ppm to 470 mass ppm, for example, may be defined as the reference range.

It is considered that one of the reasons for the high halogen eluted amounts in sample 1 and sample 2 may be as follows, for example: the duration of mechanomilling treatment was short and thereby the reaction did not proceed sufficiently and the slurry was left to stand for a long time.

It is considered that one of the reasons for the low halogen eluted amount in sample 3 may be as follows, for example: mesitylene (nonpolar) used as a dispersion medium had a low affinity for the solid electrolyte material compared to the affinity of the carboxylate ester (polar).

As illustrated in Table 1 above, when the halogen segregation index is from 0.01 to 0.04, the ionic conductivity of the electrode tends to be high.

The present embodiments and the present examples are illustrative in any respect. The present embodiments and the present examples are non-restrictive. The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A method of producing an electrode, comprising:
preparing a slurry by mixing a solid electrolyte material, an electrode active material, and a dispersion medium;
measuring an eluted amount of a halogen element in the dispersion medium in the slurry;
rating the slurry as a good slurry when the eluted amount is within a reference range; and
producing an electrode by applying the good slurry to a surface of a base material and drying,
the solid electrolyte material including a halogen element, Li, P, and S,
the halogen element including at least one selected from the group consisting of Br and I,
the electrode comprising a first phase and a second phase, the first phase comprising the solid electrolyte material, the second phase comprising the electrode active material, the first phase comprising a halogen segregation portion, and the halogen segregation portion having segregation of the halogen element.

2. The method of producing an electrode according to claim 1, wherein the reference range is from 155 mass ppm to 470 mass ppm relative to a mass of the solid electrolyte material.

3. The method of producing an electrode according to claim 1, wherein the dispersion medium includes a carboxylate ester.

4. The method of producing an electrode according to claim 1, wherein a halogen segregation index of the electrode is from 0.01 to 0.04.

* * * * *